J. TOYOKAWA.
GYROSCOPIC COMPASS.
APPLICATION FILED DEC. 21, 1914.

1,233,527.

Patented July 17, 1917.
2 SHEETS—SHEET 1.

WITNESSES
Chas. H. Leibman
O. D. Boellhaus

INVENTOR
Junya Toyokawa
BY
ATTORNEYS

J. TOYOKAWA.
GYROSCOPIC COMPASS.
APPLICATION FILED DEC. 21, 1914.

1,233,527.

Patented July 17, 1917.
2 SHEETS—SHEET 2.

WITNESSES
Chas. H. Leibman
O. D. Rollhaus

INVENTOR
Junya Toyokawa
BY Munn & Co.
ATTORNEYS

UNITED STATES PATENT OFFICE.

JUNYA TOYOKAWA, OF TOKYO, JAPAN.

GYROSCOPIC COMPASS.

1,233,527.  Specification of Letters Patent.  Patented July 17, 1917.

Application filed December 21, 1914. Serial No. 878,290.

*To all whom it may concern:*

Be it known that I, JUNYA TOYOKAWA, a subject of the Emperor of Japan, residing at Tokyo, Japan, have invented a new and Improved Gyroscopic Compass, of which the following is a full, clear, and exact description.

This invention relates to gyroscopic compasses and the improved construction in accordance with my invention comprises two gyro-wheels arranged in such a way that the axis of rotation of one of them is constrained to move in a horizontal plane and that of the other of them is constrained to move in a vertical plane while being also constrained to move in the same horizontal plane as the first mentioned wheel, the axis of which when the system is held by gravity, will, in a position of equilibrium, point to the celestial pole while the axis of the other wheel will point to the N.—S. direction.

The objects of my invention are firstly to apply the foregoing principle in a gyroscopic compass for finding the N.—S. direction; secondly, to determine the latitude of a given place as indicated by the inclination of the axis of a gyro-wheel to the horizontal; thirdly, to dampen the oscillation, by a flexible connection, between the two gyro-wheels so as to cause some torsional oscillation about the vertical axis and absorb the energy of this oscillation in a suitable resistance; fourthly, to dampen the oscillation by means of a suitable resistance applied on the horizontal axis by which the axis of the gyro-wheel is constrained to move in a vertical plane; fifthly, to correct the deflections of an ordinary gyroscopic compass, for a given latitude, instead of using the gyro-wheel whose axis of rotation is constrained to move in a horizontal plane in the said arrangement, by turning the axes of the two gyro-wheels about the vertical axis relatively to each other according to the inclination of the axis of the gyro-wheel whose axis of rotation is constrained to move in a vertical plane; and sixthly, to simplify the aforesaid arrangement in such manner that the revolving axle of the gyro-wheel, whose axis of rotation is constrained to move in a vertical plane, is slightly inclined to the vertical so as to produce a suitable approximate displacement about the vertical axis, corresponding to the deflections due to latitude caused between the axes of the gyro-wheels according to the inclination of the axis of the gyro-wheel whose axis of rotation is constrained to move in a vertical plane.

In order that my invention may be clearly understood I will describe same fully with reference to the accompanying drawings, wherein.

Figure 1:
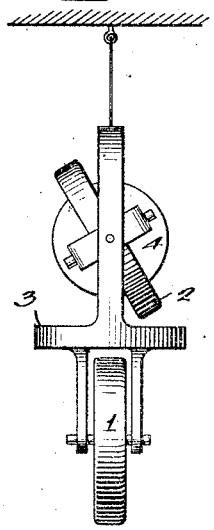
Figures 1 and 2 illustrate the principle or whole system of this invention, and show the side and front views respectively.
Figure 2:
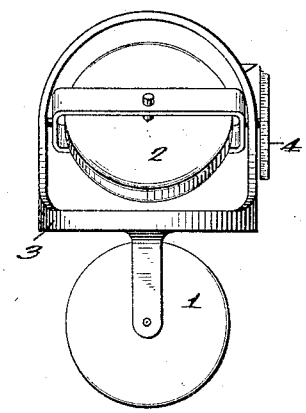

In Figs. 1 and 2, the axis of the first gyro-wheel 1 is constrained to move in a horizontal plane, that is, having a two-degree freedom of movement, while that of the second gyro-wheel 2 is constrained to move in a vertical plane while being also constrained to move in the same horizontal plane as the first wheel 1 that is, having a three-degree freedom of movement. When the frame-casing or housing, carrying the said gyro-wheels is held by gravity, or by other suitable means, for the aforesaid purpose, the axis of wheel 1 will begin to turn to N. S. direction as in the ordinary gyroscopic compass, but wheel 2 will resist this motion of the whole frame while at the same time being enforced to turn angularly in a vertical plane because of gyroscopic resistance and precession of wheel 2 until the turning moment of wheel 1 gains on its component on a horizontal plane. These motions will continue and be repeated, that is, they will oscillate. If the energy required for those oscillations be absorbed, the whole system will quickly settle down, and the axis of wheel 1 will point to the N. S. direction and that of wheel 2 will point to the celestial pole, because the axes of gyro-wheels makes smaller angle to the axis of the earth's rotation than that they would make in other positions, that is, being the most stable in that position.

This position of wheel 2 is used to determine the latitude, and to fix the axis of the said gyro-wheel in correct relation, in case of the ordinary gyroscopic compass (which requires correction for a given latitude) being used in place of the aforesaid first gyro-wheel. (This will be further explained later.) Again the determination of the latitude is effected by means of a dial 4, attached to the axle which carries the casing of wheel 2.

Figure 3:
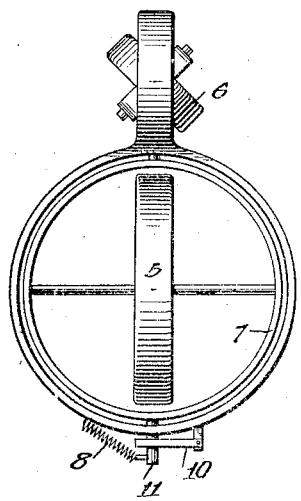
Figs. 3 and 4 show the side and front views of the whole system with damping arrangement.
Figure 4:
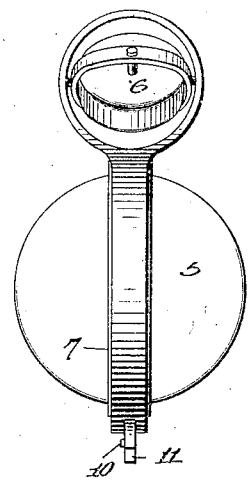
Figure 5:
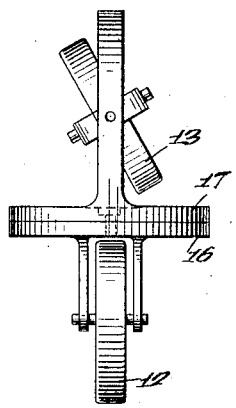
Figs. 5 and 6 show in side and front view the connection between the first and second gyro-wheels.
Figure 6:
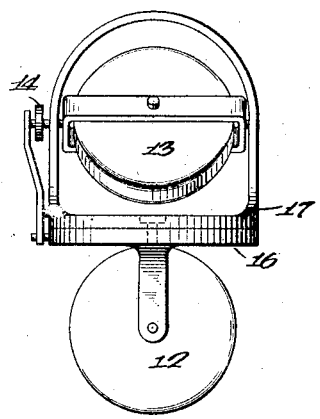
Figure 7:
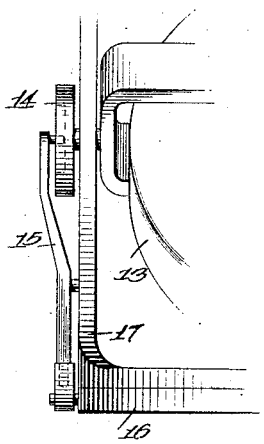
Figs. 7 and 8 show in side and front views on an enlarged scale the connection between the said wheels.
Figure 8:
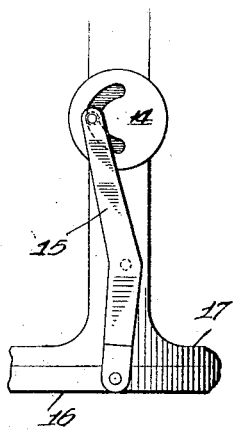

As shown in Figs. 3 and 4, the system of my invention can be used to dampen the oscillations of the wheels by a flexible connection between the two gyro-wheels 5 and 6 about the vertical axis by holding casing 7 of wheel 5 by spring 8 or by gravity or by other suitable means to frame 9, so as to cause torsional oscillation between these elements, the energy required for this oscillation being absorbed in a suitable resistance, for instance, spring 10 bearing on axis 11, can be used for this purpose. The intensity of this resistance is so arranged that the correct relation of the axes of the two gyro-wheels will not thereby be disturbed in their position of rest. In this arrangement the oscillations of the gyro-wheels will take place as in the first described arrangement, while at the same time these oscillations cause the oscillation between casing 7 and frame 9, and it will be absorbed in some suitable resistance, and the amplitude of these oscillations will be continually diminished and the axes will settle down into a position of equilibrium.

A very simple method for damping is to apply a suitable resistance to the axle which supports the casing as in the first arrangement.

In an ordinary gyroscpoic compass the damping of the oscillations is effected by the gyro-wheel during its vertical oscillation, and such damping arrangement introduces the deflection due to latitude. My present invention avoids this trouble. In case of the ordinary gyroscopic compass being used, which requires a correction due to latitude, in place of the first gyro-wheel, it is necessary to turn the axes of the two gyro-wheels relatively on the horizontal plane, the amount of deflection corresponding to the inclination of the axis of the second gyro-wheel, in order to obtain the correct N. S. direction. As shown in Figs. 5, 6, 7 and 8 the movement of cam 14 which is fixed on the turning axle of wheel 13 transmits motion to lever 15, which turns about a vertical axis supporting frame 16 of wheel 12 relatively to frame 17.

Having now particularly described and ascertained the nature of my said invention and in what manner the same is to be performed, I declare that what I claim is:

1. A gyroscopic compass consisting of gyro-wheels, the axis of rotation of one of which being constrained to move in a horizontal plane, and that of another being constrained to move in a vertical plane and also in the same horizontal plane as the first named wheel, said axes, when in equilibrium always pointing, respectively, to the North-South and to the celestial poles.

2. In a gyroscopic compass for determining latitudes, gyro wheels respectively having two degree and three degree freedoms of movement, the axes of said wheels, when in equilibrium, always pointing, respectively, to the North-South and to the celestial poles, and a scale member associated with the gyro-wheel having a three degree freedom of movement.

3. In a gyroscopic compass, gyro-wheels respectively having two-degree and three-degree freedoms of movement, a flexible connection between said gyro-wheels to cause torsional oscillation about the vertical axis, and a resistance to absorb the energy of such oscillation.

4. In a gyroscopic compass, gyro wheels respectively having two-degree and three degree freedoms of movement, the axes of said wheels, when in equilibrium, always pointing, respectively, to the North-South and to the celestial poles, and means to absorb the energy of precession of said wheels to bring them quickly to a state of equilibrium.

In testimony, that I claim the foregoing as my invention, I have signed my name in presence of two subscribing witnesses.

JUNYA TOYOKAWA.

Witnesses:
 HENRY B. HITCHCOCK,
 GENJI KURIBARA.